United States Patent [19]

Doggett, Jr. et al.

[11] 4,372,159

[45] Feb. 8, 1983

[54] AEROELASTIC INSTABILITY STOPPERS FOR WIND TUNNEL MODELS

[75] Inventors: Robert V. Doggett, Jr., Hampton; Rodney H. Ricketts, Newport News, both of Va.

[73] Assignee: The United States of America as represented by the Administrator of the National Aeronautics and Space Administration, Washington, D.C.

[21] Appl. No.: 274,706

[22] Filed: Jun. 17, 1981

[51] Int. Cl.³ .............................................. G01M 9/00
[52] U.S. Cl. ....................................................... 73/147
[58] Field of Search ........................................ 73/147

[56] References Cited

U.S. PATENT DOCUMENTS 2,721,476 10/1955 Pindzola et al.
2,788,661 4/1957 Post et al.
3,068,690 12/1962 O'Dair et al. .......................... 73/147
3,070,998 1/1963 Schreiber.
3,587,306 6/1971 Bryan.
3,903,740 9/1975 Baldwin.

*Primary Examiner*—S. Clement Swisher
*Attorney, Agent, or Firm*—H. Osborn; J. Manning; W. Nelson

[57] ABSTRACT

A mechanism 10 for diverting the flow in a wind tunnel from the wing 20 of a model being tested therein. The wing 20 is mounted on the wall 30 of a tunnel. A diverter plate 11 is pivotally mounted on the tunnel wall 30 ahead of the model. An actuator 18 fixed to the tunnel is pivotally connected to the diverter plate 11, by plunger 15. When the model is about to become unstable during the test the actuator 18 moves the diverter plate from the tunnel wall to divert flow about the wing and change the effective sweep angle thereof maintaining stable model conditions. The diverter plate is then retracted to enable normal flow.

12 Claims, 5 Drawing Figures

AEROELASTIC INSTABILITY STOPPERS FOR WIND TUNNEL MODELS

ORIGIN OF THE INVENTION

The invention described herein was made by employees of the United States Government and may be manufactured by or for the Government for governmental purposes without the payment of any royalties thereon or therefor.

BACKGROUND OF THE INVENTION

Wind tunnel testing of aeroelastic models often jeopardizes the model because aeroelastic instabilities such as flutter and divergence produce large, rapidly increasing model deformations that can lead to structural failure, thus destroying or severely damaging the model. It is common practice in aeroelastic model testing to take some precautions to minimize the risk of model damage when an aeroelastic instability is encountered. One method, called subcritical response technique, is to avoid encountering an instability by taking a series of measurements at conditions below the stability boundary and using these measurements in an analysis to predict the conditions at which the instability will occur. Although subcritical response methods show considerable promise, none has been developed that can be used with confidence in a variety of applications. In applications where subcritical techniques are applicable, it is usually necessary to reach at least one instability condition to verify the method.

Another means of reducing the risk of model damage is to conduct aeroelastic model studies in wind tunnels that have a means for rapidly reducing flow dynamic pressure. These means include such things as spoilers that are deployed in the tunnel diffuser to provide a choking effect and piping and valve arrangements that are used to short circuit flow between the low speed leg of the tunnel and the test section plenum. The spoiler is usually used in small tunnels and is usually very effective. The valve-piping system is more applicable to large tunnels and is not as effective as the spoiler. However, in both cases the wind tunnel must be equipped with the device before it can be used, requiring extensive modifications to the tunnel. Other methods of minimizing the risk of model damage include physical restraints to the model such as cables which are normally slack but become taut when the model deflection reaches a preset value. Although cable and other passive restraint methods are usually effective in minimizing model damage, their pressure does distort the flow over the model and does affect the dynamic characteristics of the model.

There is thus seen to be a need in the art for an improved aeroelastic instability stopper for wind tunnel models.

Accordingly, it is an object of the present invention to provide an improved apparatus for preventing large, potentially destructive deformations in wind tunnel models.

It is another object of the present invention to provide an instability stopper which is mechanically simple.

It is a further object of the present invention to provide an instability stopper which is capable of rapid actuation at any test condition.

It is yet another object of the present invention to provide an instability stopper which is adaptable to use in any wind tunnel.

It is also an object of the present invention to provide an instability stopper which is noninterfering with the dynamic characteristics of the model.

It is still another object of the present invention to provide an instability stopper which is noninterfering with the flow field around the model.

SUMMARY OF THE INVENTION

The foregoing and other objects are attainable according to the present invention by providing a simple air-flow diverter consisting of one or more plates hinged to the wall of the wind tunnel upstream of the model to be tested, and an actuator mechanism with a linearly extendable and retractable plunger shaft by which the plate(s) is deployed, deflecting the air flow over the model.

To minimize aeroelastic interference the device can be recessed in the wind tunnel wall, fuselage half-body, or splitter plate, depending on the application.

A more complete appreciation of the invention and many of the attendant advantages thereof will be readily apparent as the invention becomes better understood by reference to the following description when considered in conjunction with the accompanying drawings wherein:

DESCRIPTION OF THE PREFERRED EMBODIMENTS

The invention is generally designated 10. Three embodiments are shown, each as used in studies of swept-forward wings. Like numbers in the several embodiments refer to equivalent parts.

Figure 1:
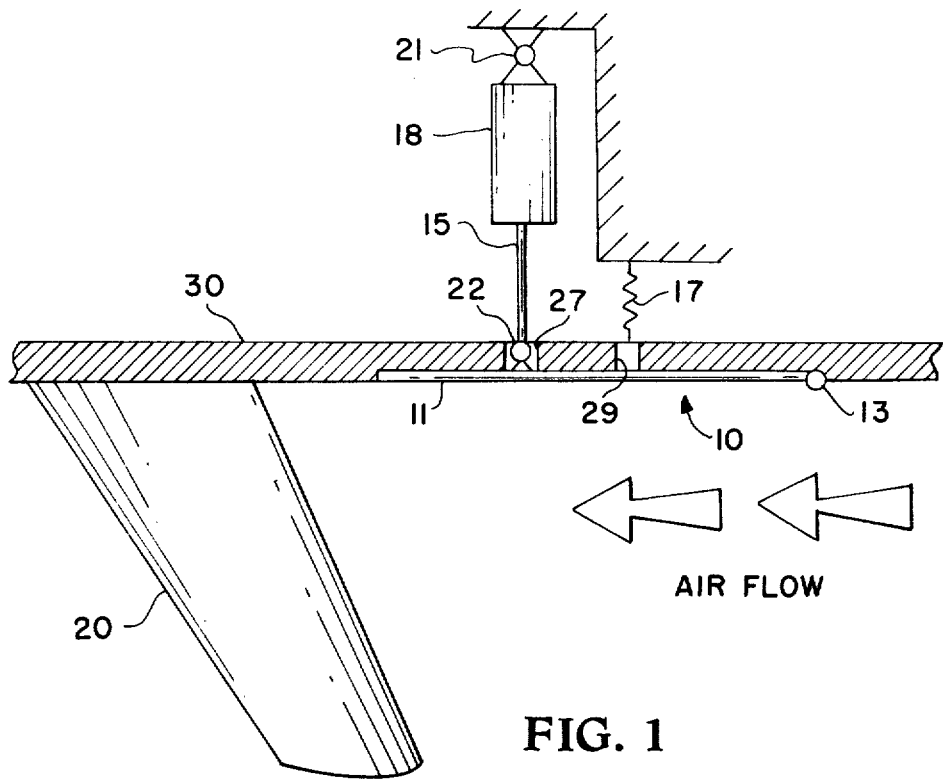
FIG. 1 is a top view of the single-plate embodiment, in the stored position.
Figure 2:
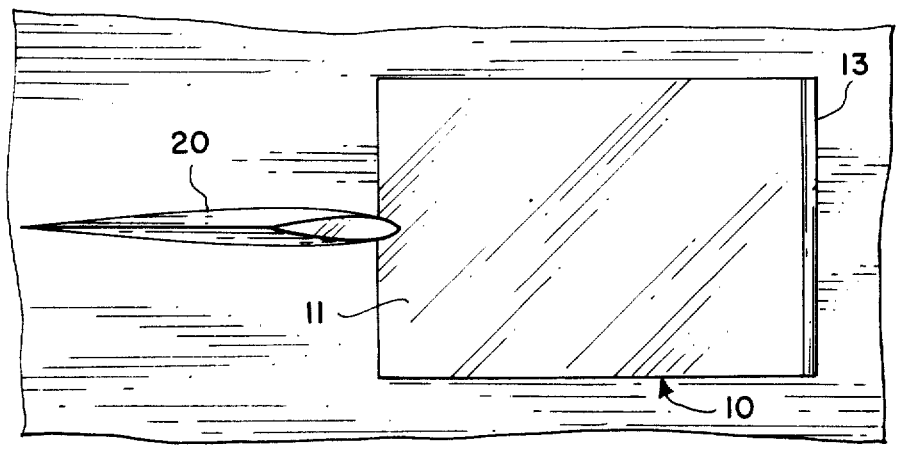
FIG. 2 is a side view of the single-plate embodiment, in the stored position.
Figure 3:
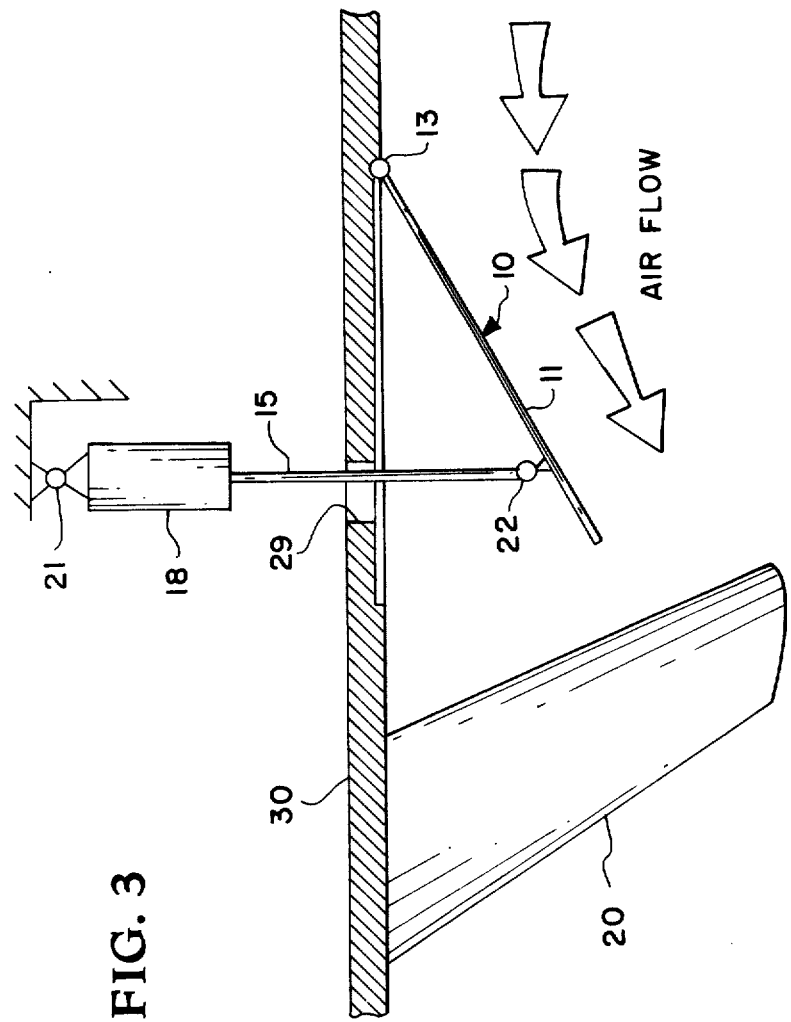
FIG. 3 is a top view of the single-plate embodiment, in the deployed position.

Referring now to FIGS. 1, 2 and 3, a single-plate embodiment is shown. The wing is designated 20. The invention comprises diverter plate 11, attached to wind tunnel wall 30 upstream of the model by hinge 13, actuator push rod 15, and pivot 22, actuator 18, and return spring 17. Actuator 18 is anchored by pivot 21 to allow the actuator and shaft 15 to rotate through the small arc described by pivot 22, with respect to shaft 15, as diverter plate 11 swings on hinge 13. Apertures 27 and 29 are provided in the wall 30 to allow the shaft 15 and spring 17 to pass therethrough. The plate is recessed into the wind tunnel wall, fuselage half-body, or splitter plate, so that when retracted there is no aerodynamic interference produced by the plate. For thin plates, a flush mounting with the wind tunnel wall is satisfactory.

Figure 4:
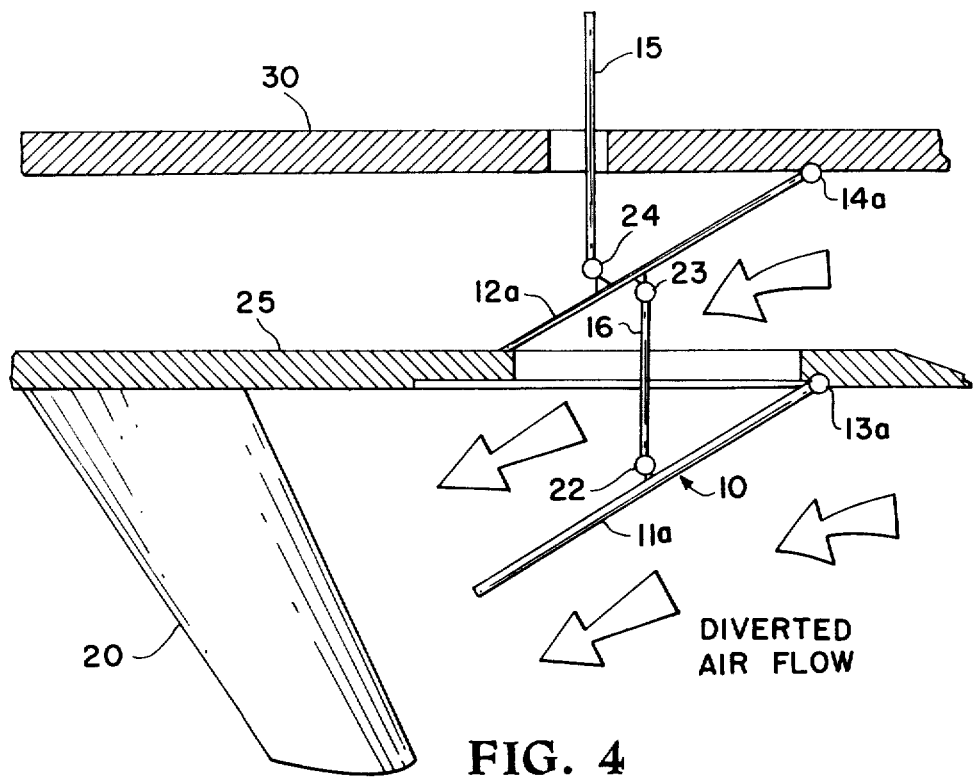
FIG. 4 is a top view of the double-plate embodiment, for use with a splitter plate, in the deployed position.

FIG. 4 shows another embodiment of the invention, for applications where the wing is mounted off the wind tunnel wall on a splitter plate. Two diverter plates 11a and 12a are used. The inner plate 12a diverts the flow from behind the splitter plate 25, so that the air is channeled through a hole in the splitter plate over the inboard portion of the wing 20. The outer plate 11a performs the same function as described previously for the single plate. Pivot 22 on the outer plate 11a is connected to rigid linkage 16, the other end of which is connected by pivot 23 to inner diverter plate 12a. The inner diverter plate 12a is hinged to the wind tunnel wall 30 by hinge 14a, and is connected by pivot 24 to actuator push rod 15. Extension and retraction of push rod 15 moves the inner and outer diverter plates in tandem. A return spring 17 is used to retract the diverter plates.

Figure 5:
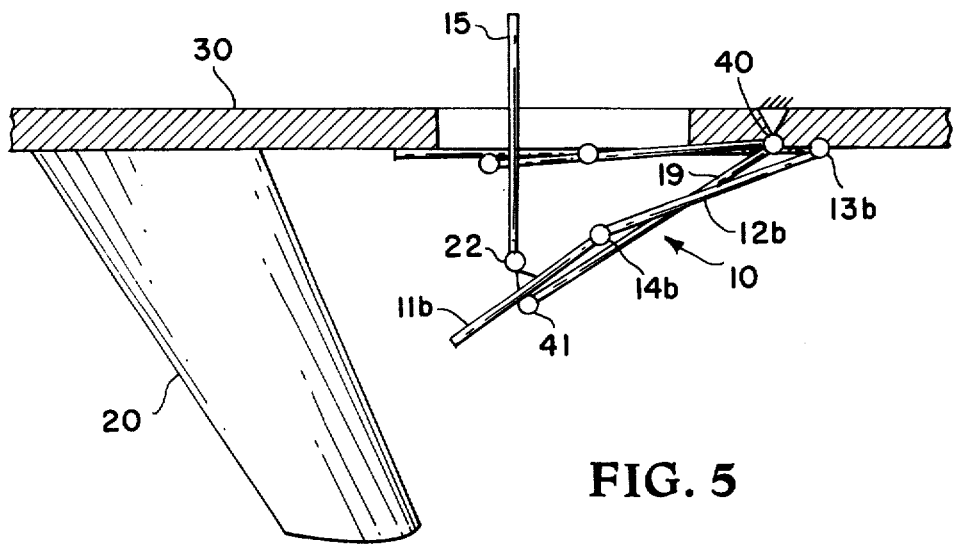
FIG. 5 is a top view of a two-segment plate embodiment, in the deployed position.

FIG. 5 shows a two-segment embodiment of the invention for use if a more gradual turning of the flow is required. This embodiment differs from the single plate embodiment, described above, in the division of the diverter plate into two portions 11b and 12b and insertion therebetween of connecting hinge 14b. Linkage 19 is pivotally connected at 40 to the tunnel wall 30 behind the pivotal connection 13b of the diverter plate. The other end of the linkage 19 is pivotally connected at 41 to the outside surface of the portion 11b of the diverter plate at its approximate center. Since the linkage 19 is pivoted behind the diverter plate of pivotal connection 13b it results in a shorter arm which causes the portion 11b of the diverter plate to be positioned at greater angle with respect to the wall 30 than the portion 12b.

OPERATION OF THE INVENTION

When it is determined (through other means, known in the wind tunnel test art) that the instability limit of the model is being approached, the diverter plate (or plates) is (are) deployed. Actuator 18 is remotely controlled and quick acting, powered either electrically, pneumatically, or hydraulically. When the diverter plate (or plates) 11 is (are) deployed, the air flow is diverted over the outboard portion of the model, in the FIGS. 1 and 5 embodiments. This results in the airflow over the outboard portion of the wing effectively reducing the sweep angle over the outboard portion of the wing. The velocity inboard is reduced by the shielding effect of the plate; however, the flow may be turbulent because of eddies produced by flow off the edges of the plate. In some circumstances this turbulent flow can produce buffet-like response. The double plate FIG. 4 embodiment is a solution to this problem because the flow is diverted smoothly over the inboard portion of the wing 20 by the inner plate 12a. the inner and outer plate 12a and 11a act in combination to reduce uniformly over the entire wing span, not just the outboard portion as with the single plate. Although flow inboard is at a higher velocity with the double plate, the flow is smoother and produces less buffet-like response. Both the single and double plate arrangements have their advantages depending on the type model being tested and the test circumstances effectively preventing instability of the model. This reduction in sweep angle increases the divergence speed thereby controlling instability and possible damage to the model.

Although the invention has been described relative to specific embodiments thereof, it is not so limited and numerous variations thereof will be readily apparent to those skilled in the art. For instance, return spring 17 is not needed for certain types of actuators 18.

What is claimed as new and desired to be secured by Letters Patent of the United States is:

1. A device for diverting the flow over a model aircraft in a wind tunnel test comprising:
   wind tunnel means having walls forming a test section;
   plate means associated with a wall of the test section;
   pivoting means for connecting said plate means to the wall of the wind tunnel; and
   actuation means for controllably deploying said plate means into said test section to divert flow from a model being tested therein preventing instability of the model.

2. The combination of claim 1 wherein said pivot means is a hinge.

3. The combination of claim 2 wherein said actuation means includes a longitudinally extendable and retractable shaft passing through an opening in, the wall of the wind tunnel, and the projecting end of said shaft being hingedly connected to said plate means, whereby linear motions of said shaft are translated into angular motions of said plate appropriate to divert the air flow over the model wing as desired as said shaft is extended and retracted.

4. The combination of claim 3 wherein the said plate means further includes, at approximately its midsection, hinge means and linkage means whereby the said plate means deploys to form two surfaces, the surface adjacent the wind tunnel wall at a first angle, and the other surface at a greater angle, to the air flow.

5. The combination of claim 3 wherein splitter plate means is mounted in said test section, a second plate means hinged to said splitter plate, and linkage means connecting said other plate means with said second plate means enabling said plate means to be deployed together.

6. The combination of claim 5 wherein said splitter plate is spaced from said test section wall and has an opening to allow flow therethrough, said other plate means diverting flow from between said test section wall and splitter plate through said splitter plate opening; and
   said second plate means diverting flow from said splitter plate opening and in said wind tunnel section to control flow about said model.

7. The combination of claim 1 wherein elastic means is attached to said plate means for retracting said plate means.

8. The combination of claim 7 wherein said elastic means is a spring.

9. The combination of claim 1 wherein said test section wall is recessed to receive said plate means and pivot means.

10. The combination of claim 3 wherein said actuation means is electrically operated.

11. The combination of claim 3 wherein said actuation means is pneumatically operated.

12. The combination of claim 3 wherein said actuation means is hydraulically operated.

* * * * *